(12) United States Patent
Kim

(10) Patent No.: US 6,832,412 B2
(45) Date of Patent: Dec. 21, 2004

(54) HINGE ASSEMBLY OF AUTOMOBILE ARMREST

(75) Inventor: Hyun Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/331,241

(22) Filed: Dec. 30, 2002

(65) Prior Publication Data

US 2003/0208882 A1 Nov. 13, 2003

(30) Foreign Application Priority Data

May 7, 2002 (KR) ................................ 10-2002-0024991

(51) Int. Cl.⁷ ................................................. E05D 7/00
(52) U.S. Cl. ............................ 16/354; 16/365; 16/389; 297/188.14; 297/188.19
(58) Field of Search .................. 16/354, 365, 389–392; 220/264, 263, 830; 224/275; 297/188.19, 188.14, 411.21, 411.35, 411.32; 296/37.14, 37.8

(56) References Cited

U.S. PATENT DOCUMENTS

| | | | | | |
|---|---|---|---|---|---|
| 1,045,927 A | * | 12/1912 | Zelenyy et al. | ................ | 4/236 |
| 1,799,310 A | * | 4/1931 | Mears | ........................ | 16/365 |
| 1,816,834 A | * | 8/1931 | Eva | ................................ | 16/50 |
| 2,060,852 A | * | 11/1936 | Campbell | ...................... | 4/236 |
| 5,121,521 A | * | 6/1992 | Hagiwara et al. | ............. | 16/278 |
| 5,209,016 A | * | 5/1993 | Yamada | ........................ | 49/193 |
| 5,566,424 A | * | 10/1996 | Crompton et al. | ............ | 16/342 |
| 6,191,937 B1 | * | 2/2001 | Bang | .......................... | 361/681 |

FOREIGN PATENT DOCUMENTS

| | | | | |
|---|---|---|---|---|
| DE | 19724597 C1 | * | 11/1998 | ............ B60N/3/10 |
| DE | 19819691 A1 | * | 11/1999 | ............ E05C/19/02 |
| JP | 04050046 A | * | 2/1992 | ............ B60R/7/04 |
| JP | 07215133 A | * | 8/1995 | ............ B60R/7/04 |
| JP | 11151982 A | * | 6/1999 | ............ B60R/7/04 |
| JP | 2000272426 A | * | 10/2000 | ............ B60R/7/04 |
| JP | 2002331875 A | * | 11/2002 | ............ B60R/7/04 |

* cited by examiner

*Primary Examiner*—Chuck Y. Mah
(74) *Attorney, Agent, or Firm*—Morgan Lewis & Bockius LLP

(57) ABSTRACT

Disclosed is a hinge assembly for an automobile armrest for reducing or preventing noise during the opening/closing of the armrest and providing smooth opening/closing force using a damping force of gears. In the hinge assembly, a first body includes a first mounting plate, a pair of first rotating members, and a first fixed gear. A second body includes a second mounting plate, a pair of second rotating members, and a second fixed gear. Hinge shaft is coaxially aligned to the first and second fixed gears at lower ends of the first rotating member of the first body and the second rotating member of the second body. A pair of springs is wound around both outer surfaces of the hinge shaft and provides a resilient force to the first and second bodies. A support plate is mounted at a rear space of a second stage tray.

8 Claims, 7 Drawing Sheets

HINGE ASSEMBLY OF AUTOMOBILE ARMREST

FIELD OF THE INVENTION

The present invention relates to an automobile armrest, and more particularly, to a hinge assembly for an automobile armrest.

BACKGROUND OF THE INVENTION

A console is located between a driver seat and a passenger seat and stores various articles such as drinking cups and other small articles. An armrest covers the console and provides a comfortable forearm rest for the driver and/or passenger.

Conventional consoles typically include first and second stage trays as storage areas under the armrest. Small articles such as coins and tissues are stored in the first stage tray. Bigger articles are stored in the second stage tray. In order to use the first stage tray, the armrest is lifted upward and opened. In order to use the second stage tray, the armrest and the first stage tray are simultaneously lifted upward and opened. Accordingly, a hinge assembly having two hinge points is required in such a configuration.

However, with available hinges, during the opening/closing of the armrest, or the armrest and the first stage, noises (sound such as "tung" generated when the springs are rebounded) are generated due to repelling forces of springs in the mechanism. Moreover, since the armrest is light, it is easily opened with little force. Accordingly, when the armrest is lifted upward, the springs rebound in the completed position of the lifting operation to generate noises. Accordingly, a user must grab the armrest by the hand until it is closed. Also, the conventional hinge device has many elements including a pair of hinge assemblies, two springs, and two hinge pins and the like. Since hinge points are set to two positions, a wide installation area and a plurality of work processes are required which deteriorate assembly efficiency.

SUMMARY OF THE INVENTION

Embodiments of the present invention provide a hinge assembly of an automobile armrest which reduces or prevents noise during the opening/closing of the armrest and provides a smooth opening/closing force using the damping force of gears. Embodiments of the invention also reduce installation area and the thickness of the armrest by setting a hinge point to one position so as to reduce the weight and the cost of the armrest.

In a preferred embodiment of the invention, a first body includes a first mounting plate, a pair of first rotating members, and a first fixed gear. The first mounting plate is mounted at a rear lower surface of the armrest. The pair of first rotating members are integrally formed on both lower surfaces of the first mounting plate. The first fixed gear is attached to an outer and lower surface of one of the first rotating members. A second body includes a second mounting plate, a pair of second rotating members, and a second fixed gear. The second mounting plate is mounted at a rear lower surface of a first stage tray. The pair of second rotating members are integrally formed on both lower surfaces of the second mounting plate. The second fixed gear is attached to an inner and lower surface of one of the second rotating members. A hinge shaft is coaxially aligned with the first and second fixed gears at lower ends of the first rotating member of the first body and the second rotating member of the second body. A pair of springs are wound around both outer surfaces of the hinge shaft to provide a resilient force to the first and second bodies. A support plate is mounted at a rear space of a second stage tray. First and second rotating gears are formed at an upper surface of the support plate, the first and second rotating gears being engaged with the first and second fixed gears, respectively, to be freely rotated.

Preferably, the size of the second body is smaller than that of the first body and the second body is located and assembled at an inner space of the first body. More preferably, first and second gear teeth are formed at outer surfaces of the first and second fixed gears by rotating ranges of the first and second bodies, respectively.

A pair of vertical plates are also preferably formed at an upper surface of the support plate. One of the vertical plates is located between a lower end of one of the first rotating members of the first body and a lower end of one of the second rotating members of the second body. The other of the vertical plates is located between a lower end of the other of the first rotating members and a lower end of the other of the second rotating members. Also, first two hinge axis inserting holes are formed at the pair of the first rotating members, a second hinge axis inserting hole is at the first fixed gear of the first body, third two hinge axis inserting holes are formed at the pair of the second rotating members, a fourth hinge axis inserting hole is formed at the second fixed gear of the second body, and fifth two hinge axis inserting holes are formed at the pair of the vertical plates, and the pair of first hinge axis inserting holes, the second hinge axis inserting hole, the pair of third hinge axis inserting holes, the fourth hinge axis inserting hole, and the pair of fifth hinge axis inserting holes are formed at a common axis.

BRIEF DESCRIPTION OF THE DRAWINGS

The above characteristics and advantages of the present invention will become more apparent by describing in detail a preferred embodiment thereof with reference to the attached drawings, in which.

DETAILED DESCRIPTION OF THE INVENTION

Hereinafter, the hinge assembly of an automobile armrest according to the preferred embodiment of the present invention will be explained in more detail with reference to the accompanying drawings.

Figure 1:
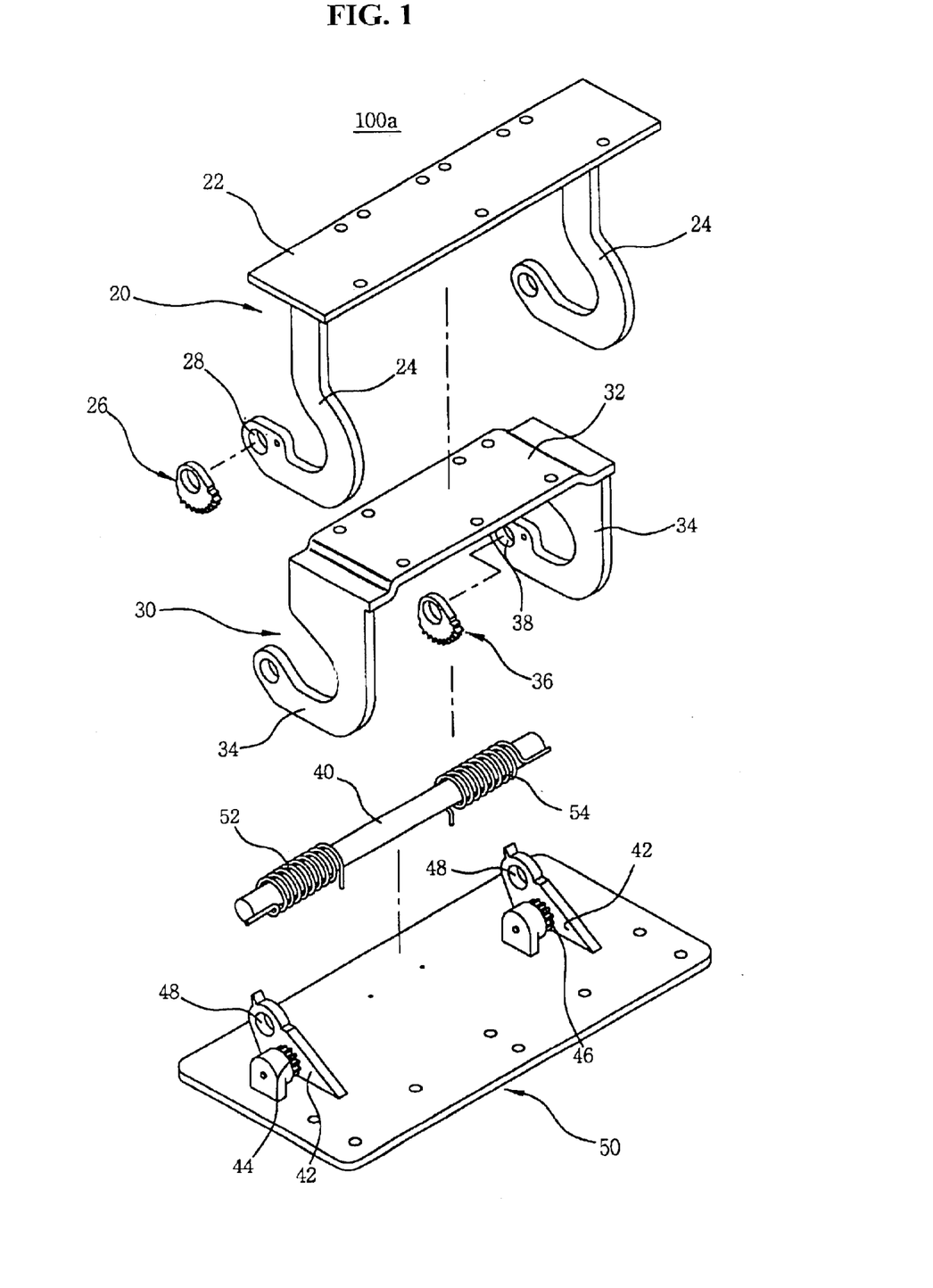
FIG. 1 is an exploded view in perspective of a hinge assembly of an automobile armrest according to a preferred embodiment of the present invention.
Figure 2:
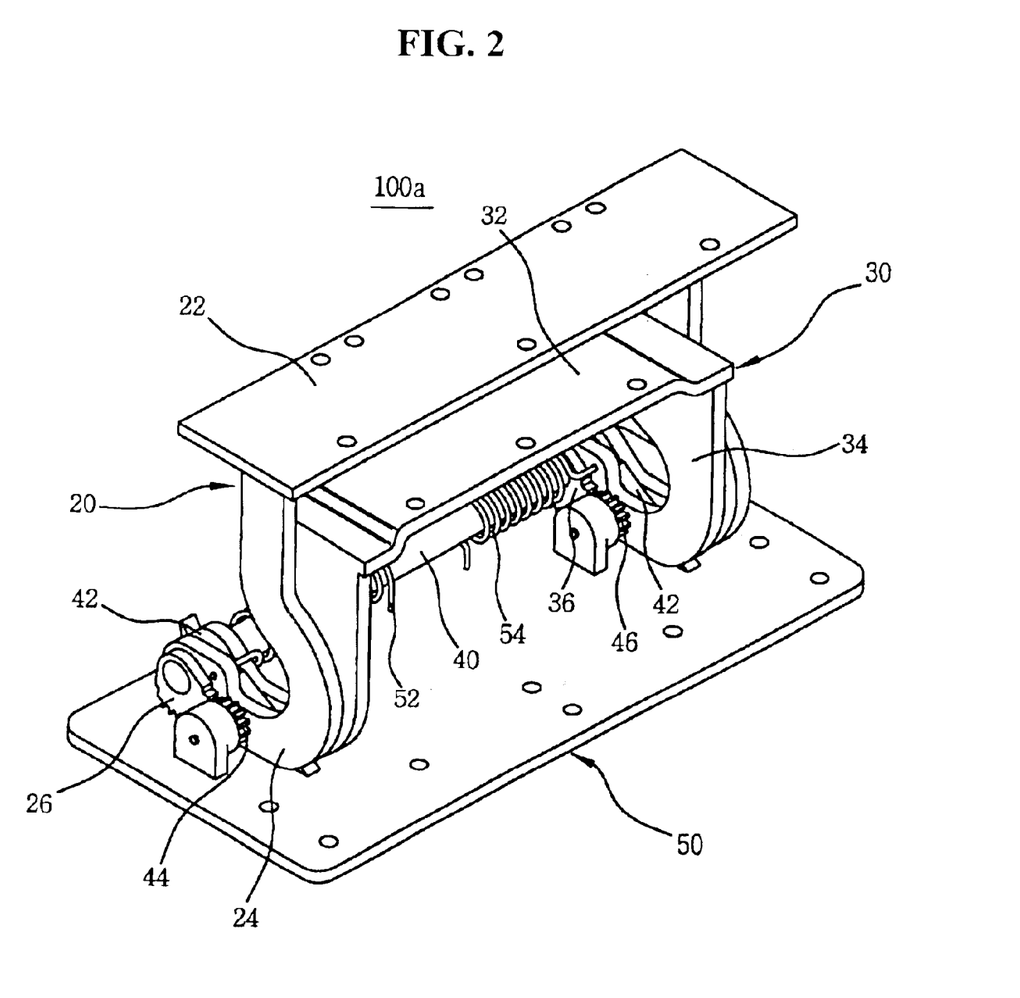
FIG. 2 is a perspective view of the assembled hinge assembly shown in FIG. 1.
Figure 3:
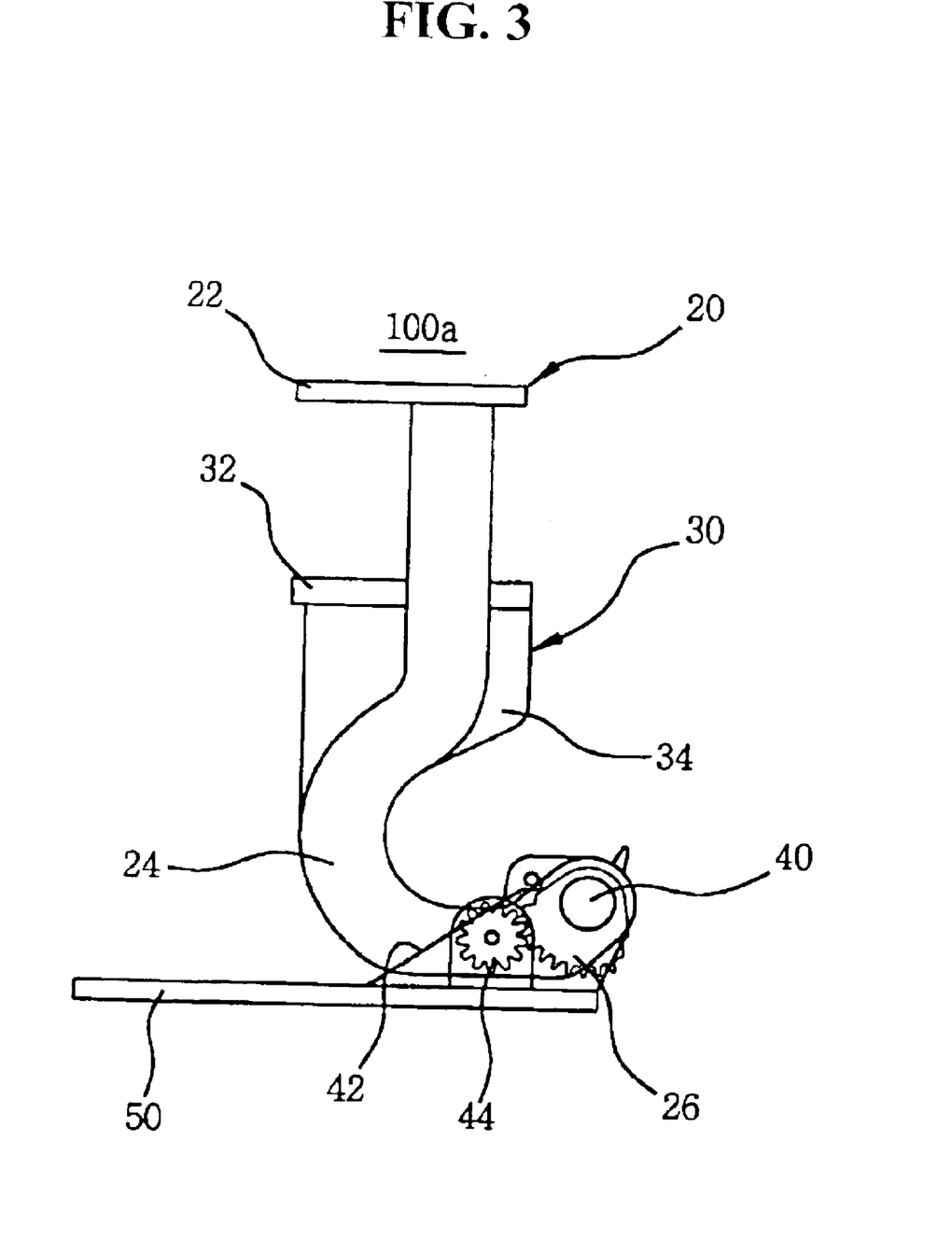
FIG. 3 is a side view of the hinge assembly shown in FIGS. 1 and 2.

As shown, for example, in FIGS. 1–3, a hinge assembly of an automobile armrest includes a first body 20, a second body 30, a hinge shaft 40, a pair of springs 52, and a support plate 50. The first body 20 has a first mounting plate 22, a pair of first rotating members 24, and a first fixed gear 26. The first mounting plate 22 is formed at an upper portion of the first body 20. The first mounting plate 22 is mounted at a rear lower surface of an armrest 10. The first mounting plate 22 is preferably rectangular in shape. The pair of first rotating members 24 are formed, preferably integrally, on both lower surfaces of the first mounting plate 22.

The first fixed gear 26 is attached to an outer and lower surface of one of the first rotating members 24. A first gear tooth is formed at an outer surface of the first fixed gear 26 by a rotating range of the first body 20. The first gear tooth has a sector. First two hinge axis inserting holes 28 are formed at lower ends of the pair of the first rotating members 24. A second hinge axis inserting hole 28 is formed at the first fixed gear 26 of the first body 20.

The second body 30 includes a second mounting plate 32, a pair of second rotating members 34, and a second fixed gear 36. The size of the second body 30 is preferably smaller than that of the first body 20, and the second body 30 is located and assembled at an inner space of the first body 20. The second body 30 preferably has the same shape as that of the first body 20. The second mounting plate 32 is formed at an upper portion of the second body 20. The second mounting plate 32 is mounted at a rear lower surface of a first stage tray 14. The second mounting plate 32 is preferably rectangular in shape.

The pair of second rotating members 34 are formed, preferably integrally, on both lower surfaces of the second mounting plate 32. The second fixed gear 36 is attached to an inner and lower surface of one of the second rotating members 34. A second gear tooth is formed at an outer surface of the second fixed gear 36 by a rotating range of the second body 30. The second gear tooth has a sector. Third two hinge axis inserting holes 38 are formed at lower ends of the pair of the second rotating members 34. A fourth hinge axis inserting hole 38 is formed at the second fixed gear 36 of the second body 30. The hinge shaft 40 is coaxially aligned to the first and second fixed gears 26 and 36 at lower ends of the first rotating member 24 of the first body 20 and the second rotating member 34 of the second body 30.

The pair of springs 52 and 54 are wound around both outer surfaces of the hinge shaft 40. The springs 52 and 54 provide a resilient force to the first and second bodies 20 and 30. The support plate 50 is mounted at a rear space of a second stage tray 16. First and second rotating gears 44 and 46 are mounted at an upper surface of the support plate 50. The first and second rotating gears 44 and 46 are engaged with the first and second fixed gears 26 and 36, respectively to be freely rotated.

A pair of vertical plates 42 are formed at an upper surface of the support plate 50 to have a predetermined distance. They may be integrally formed. One of the vertical plates 42 is located between a lower end of one of the first rotating members 24 of the first body 20 and a lower end of one of the second rotating members 24 of the second body 30. The other of the vertical plates 42 is located between a lower end of the other of the first rotating members 24 and a lower end of the other of the second rotating members 24. Fifth two hinge axis inserting holes 48 are formed at the pair of the vertical plates 42.

As shown in FIG. 2, the second body 30 is located and assembled at an inner space of the first body 20. The vertical plates 42 are formed at an upper surface of the support plate 50. One of the vertical plates 42 is located and adhered between a lower end of one of the first rotating members 24 of the first body 20 and a lower end of one of the second rotating members 34 of the second body 30. The other of the vertical plates 42 is located and adhered between a lower end of the other of the first rotating members 24 and a lower end of the other of the second rotating members 34.

Accordingly, the pair of first hinge axis inserting holes 28, the second hinge axis inserting hole 28, the pair of third hinge axis inserting holes 38, the fourth hinge axis inserting hole 38, and the pair of fifth hinge axis inserting holes 48 are formed at a common axis. The hinge shaft 40 are inserted into the pair of first hinge axis inserting holes 28, the second hinge axis inserting hole 28, the pair of third hinge axis inserting holes 38, the fourth hinge axis inserting hole 38, and the pair of fifth hinge axis inserting holes 48.

The first and second fixed gears 26 and 36 are engaged with the first and second fixed gears 44 and 46 to be freely rotated around the support plate 50. Also, the pair of springs 52 and 54 are wound around both outer surfaces of the hinge shaft 40. One side end of one spring 52 is fixed at an upper portion of the support member 50, and the other side end of the spring 52 is fixed at the first rotating member 24 of the first body 20. One side end of the other spring 54 is fixed at an upper portion of the support member 50, and the other side end of the other spring 54 is fixed at the second rotating member 34 of the first body 30.

Figure 4:
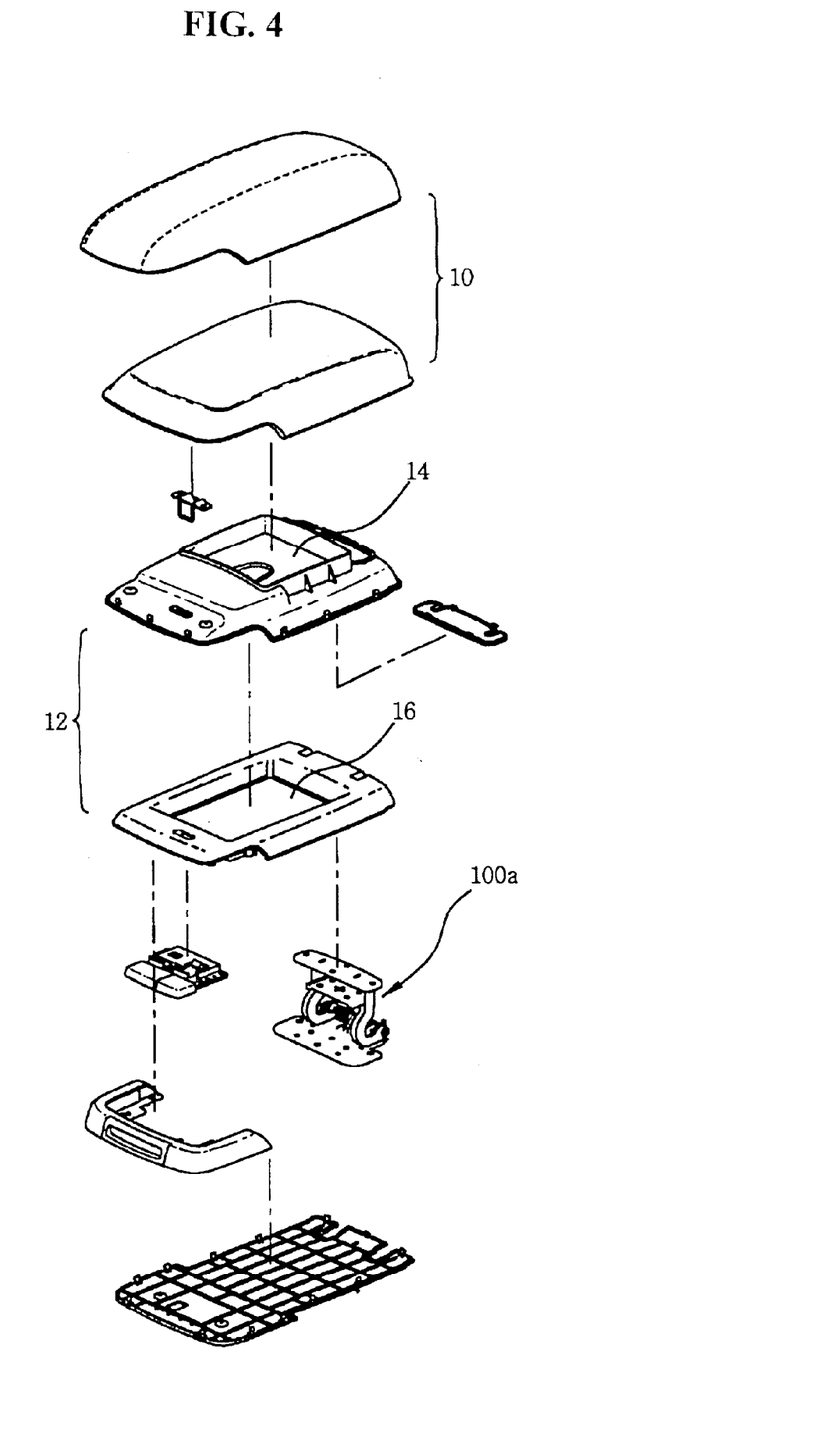
FIG. 4 is an exploded view in perspective of an automobile armrest having the hinge assembly according to a preferred embodiment of the present invention.
Figure 5:
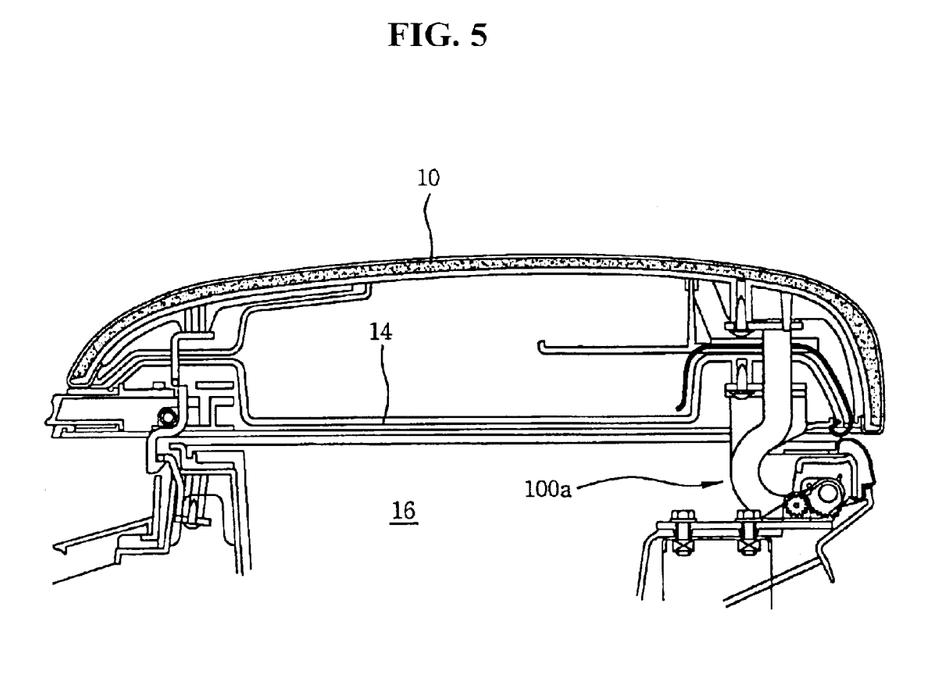
FIG. 5 is a side elevation of an automobile armrest according to a preferred embodiment of the present invention.

The assembled hinge assembly 100a is mounted at rear portions of a console 12 and an armrest 10. Mounting of the hinge assembly 100a will be explained by referring to FIGS. 4 and 5. When the armrest 10 is lifted upward, the first rotating member 24 of the first body 20 is rotated about the hinge shaft 40. At this time, the first fixed gear 26 is rotated by the same angle as a rotating angle thereof. As the first fixed gear 26 is rotated, the first rotating gear 44 being engaged therewith is freely rotated. The first mounting plate 22 of the first body 20 is screwed to a rear lower surface of the armrest 10. The second mounting plate 32 of the second body 30 is screwed to a rear lower surface of the first stage tray 14. The support plate 50 is locked to a rear portion of a console 12 by a small bolt. Accordingly, a mounting of the hinge assembly 100a is achieved.

Figure 6A:
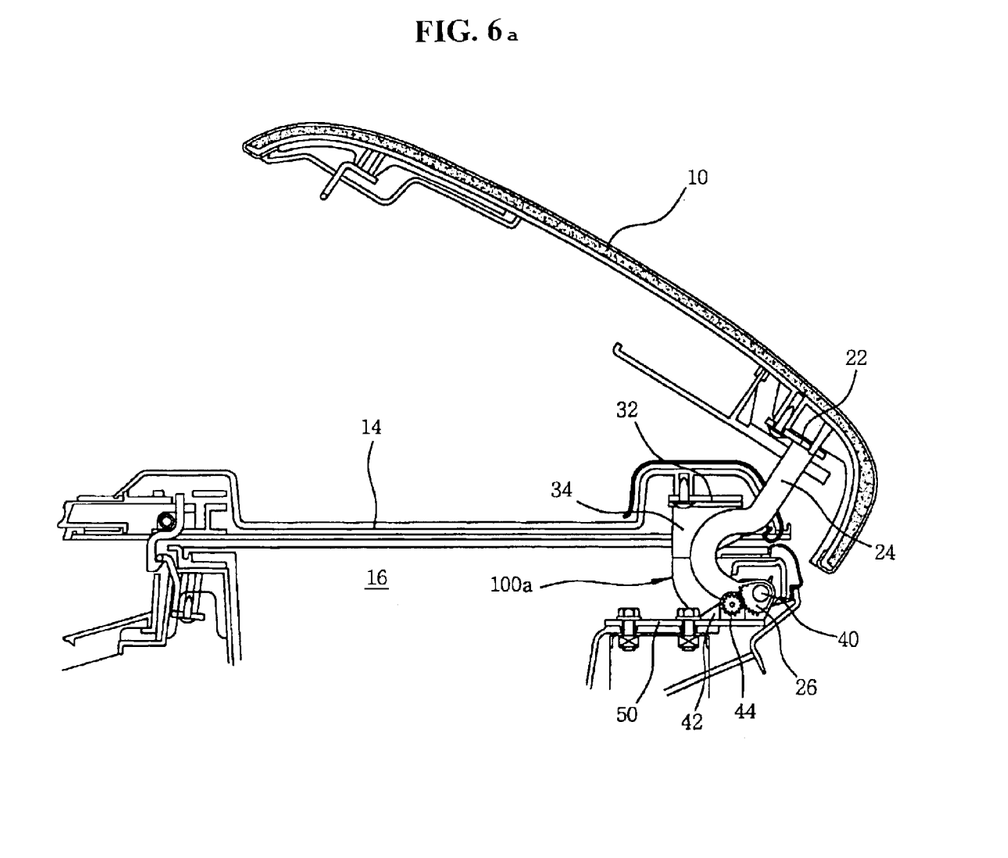
FIGS. 6a and 6b are side elevations showing first and second stage opening states of the automobile armrest according to a preferred embodiment of the present invention.

Hereinafter, first and second stage opening operations of an automobile armrest to which the hinge assembly is mounted will be described with reference to FIGS. 6a and 6b. When the armrest 10 is pressed downward, a resilient force of the first and second springs 52 and 54 is generated to slowly close the armrest 10. Simultaneously, the first rotating gear 44 being engaged with the first fixed gear 26 is freely rotated to generate a damping force. In other words, the armrest 10 is slowly closed according to the resilient force of the springs 52. The first fixed gear 26 is restored to its original position while rotating the first rotating gear 44. It provides the damping force which offsets the elastic restoring force so that the armrest 10 is softly closed without an opening/closing noise.

Additionally, the first fixed gear 26 is rotated while freely rotating the first rotating gear 44 being engaged therewith. It functions as a track having a breaking force to control a quick upward lifting of the armrest 10 during an opening of the armrest 10.

In the conventional hinge assembly, when the armrest 10 is quickly lifted upward, springs are rebounded in a completed position of the lifting operation to generate a noise. Accordingly, due to the arrangement of the present invention, as described above, the rebounding of the springs does not occur to prevent the noise from being generated.

Figure 6B:
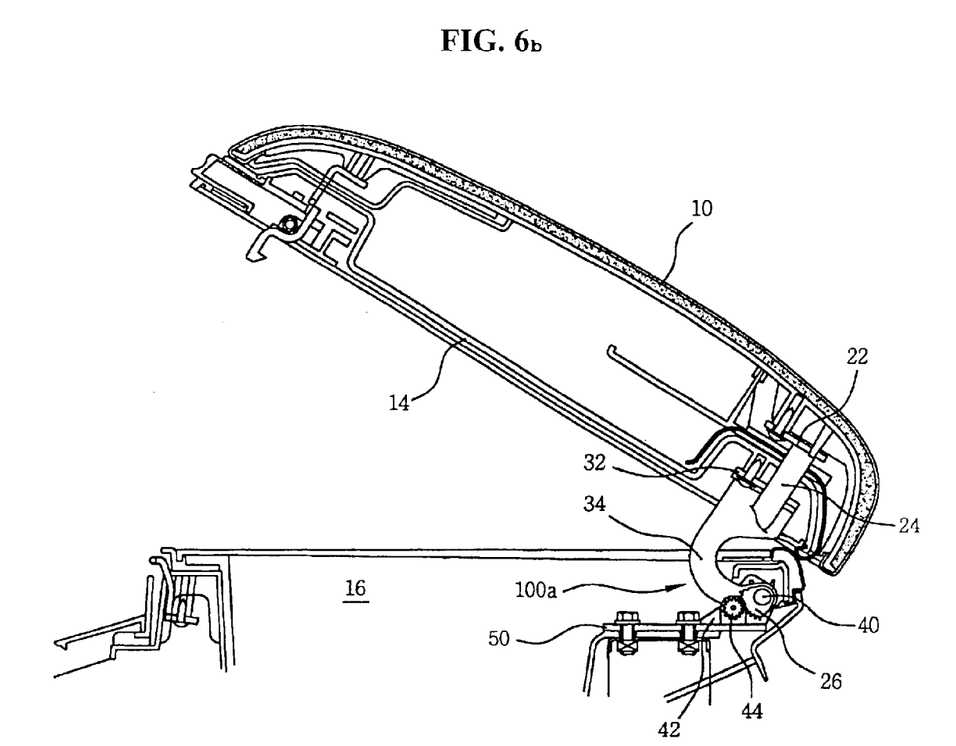

As shown in FIG. 6b, when the armrest 10 and the first stage tray 14 are simultaneously lifted upward, the first rotating member 24 of the first body 20 and the second rotating member 34 of the second body 30 are simultaneously rotated about the hinge shaft 40. At this time, the first and second fixed gears 26 and 36 are rotated in the same angles as those of the first and second rotating members 24 and 34. At the same time, as the first and second fixed gears 26 and 36 are rotated, the first and second rotating gears 44 and 46 being engaged therewith are freely rotated.

Thereafter, when the armrest 10 and the first stage tray 14 are simultaneously depressed downward in order to close them, a resilient force of the spring 54 is generated to close the armrest 10 and the first stage tray 14. Simultaneously, the first and second rotating gears 44 and 46 being engaged with the first and second fixed gears 26 and 36, respectively, are freely rotated to generate a damping force. In other words, the first and second fixed gear 26 and 36 are restored to their original positions while rotating the first and second rotating gears 44 and 46. It provides the damping force which offsets the elastic restoring force. Accordingly, the resilient force of the spring 54 slowly closes the armrest 10 and the first stage tray 14 without an opening/closing noise.

As mentioned above, compared with the conventional hinge device having two hinge points, by setting hinge points to one position, the configuration of the present invention is simplified to reduce an installation area, the cost, the weight and the thickness of the armrest. Due to a damping force of gears according to the present invention, a smooth opening/closing operating force of the armrest is provided without creating any noise.

While the present invention has been particularly shown and described with reference to a particular embodiment thereof, it will be understood by those skilled in the art that various changes in form and detail may be effected therein without departing from the spirit and scope of the invention as defined by the appended claims.

What is claimed is:

1. A hinge assembly of an automobile armrest, comprising:
   a first body including a first mounting plate, a pair of first rotating members, and a first fixed gear, wherein the first mounting plate is mounted at a rear lower surface of an armrest, the pair of first rotating members is provided on both lower surfaces of the first mounting plate, and the first fixed gear is attached to an outer and lower surface of one of the first rotating members;
   a second body including a second mounting plate, a pair of second rotating members, and a second fixed gear, wherein the second mounting plate is mounted at a rear lower surface of a first stage tray, the pair of second rotating members is provided on both lower surfaces of the second mounting plate, and the second fixed gear is attached to an inner and lower surface of one of the second rotating members;
   a hinge shaft coaxially aligned to the first and second fixed gears at lower ends of the first rotating member of the first body and the second rotating member of the second body;
   a pair of springs wound around opposite ends of the hinge shaft to provide a resilient force to the first and second bodies; and
   a support plate mounted at a rear space of a second stage tray, first and second rotating gears formed at an upper surface of the support plate, the first and second rotating gears is engaged with the first and second fixed gears, respectively to be freely rotated.

2. The hinge assembly according to claim 1, wherein a size of the second body is smaller than that of the first body and the second body is located and assembled at an inner space of the first body.

3. The hinge assembly according to claim 1, wherein first and second fixed gear teeth are formed at outer surfaces of the first and second fixed gears by rotating ranges of the first and second bodies, respectively.

4. The hinge assembly according to claim 1, wherein a pair of vertical plates are provided at an upper surface of the support plate, and one of the vertical plates is located between a lower end of one of the first rotating members of the first body and a lower end of one of the second rotating members of the second body, and the other of the vertical plates is located between a lower end of the other of the first rotating members and a lower end of the other of the second rotating members.

5. The hinge assembly according to claim 4, wherein first two hinge axis inserting holes are formed at the pair of the first rotating members, a second hinge axis inserting hole is at the first fixed gear of the first body, third two hinge axis inserting holes are formed at the pair of the second rotating members, a fourth hinge axis inserting hole is formed at the second fixed gear of the second body, and fifth two hinge axis inserting holes are formed at the pair of the vertical plates, and the pair of first hinge axis inserting holes, the second hinge axis inserting hole, the pair of third hinge axis inserting holes, the fourth hinge axis inserting hole, and the pair of fifth hinge axis inserting holes are formed at a common axis.

6. A hinge assembly for an automobile armrest, comprising:
   a support plate;
   a shaft mounted on the support plate;
   first and second rotating gears mounted on the support plate;
   a first hinge plate rotatably mounted on the shaft;
   a first fixed gear secured to the first hinge plate and meshed with said first rotating gear;
   a second hinge plate rotatably mounted on the shaft and disposed under the first hinge plate;
   a second fixed gear secured to the second hinge plate and meshed with said second rotating gear; and
   resilient means biasing said first and second mounting plates around said shaft.

7. The wing assembly of claim 6, wherein the first and second rotating gears are spaced apart approximately by a width of the second mounting plate.

8. The hinge assembly of claim 6, wherein the first and second rotating gears are disposed on said mounting plate adjacent opposite ends of the shaft.

* * * * *